United States Patent [19]

Volk

[11] 4,051,573
[45] Oct. 4, 1977

[54] POULTRY LEG RETAINER

[76] Inventor: Anthony J. Volk, 173 E. Syracuse St., Turlock, Calif. 95380

[21] Appl. No.: 567,761

[22] Filed: Apr. 14, 1975

Related U.S. Application Data

[63] Continuation-in-part of Ser. No. 476,297, June 4, 1974, Pat. No. 3,895,415.

[51] Int. Cl.$^2$ .............................................. A22C 21/00
[52] U.S. Cl. .......................................... 17/11; 17/15; 17/44.1
[58] Field of Search ................... 17/44.1, 44.3, 11, 15; 99/426; 248/505

[56] References Cited

U.S. PATENT DOCUMENTS

| | | | |
|---|---|---|---|
| 1,633,499 | 6/1927 | Selden | 17/11 |
| 1,990,580 | 2/1935 | Ashby | 99/426 |
| 2,189,421 | 2/1940 | Huschka | 17/11 |
| 2,722,712 | 11/1955 | Rabe | 17/15 |
| 2,842,443 | 7/1958 | Rice et al. | 17/11 |
| 3,112,515 | 12/1963 | Volk | 17/1.5 |

Primary Examiner—Robert Peshock
Attorney, Agent, or Firm—Alvin E. Hendricson; Edward B. Gregg

[57] ABSTRACT

A limitedly flexible retainer as an integral plastic unit having a curved upper crosspiece with hooked legs depending from the ends thereof and a bar extending between lower portions of the legs. The retainer includes a locking arrangement including extensible straps connected to the upper crosspiece and to an extensible lower crosspiece for engagement with the hocks of poultry legs to retain them in trussed position.

6 Claims, 5 Drawing Figures

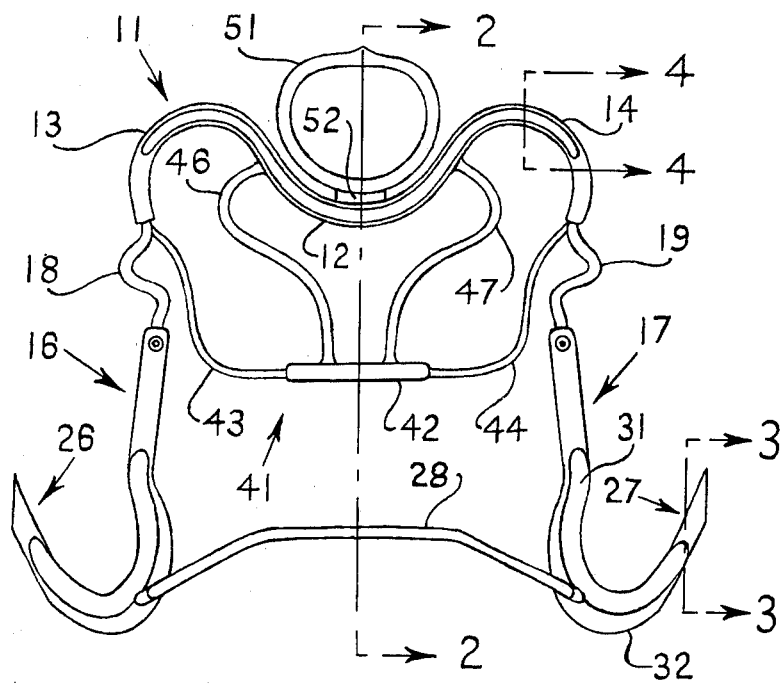
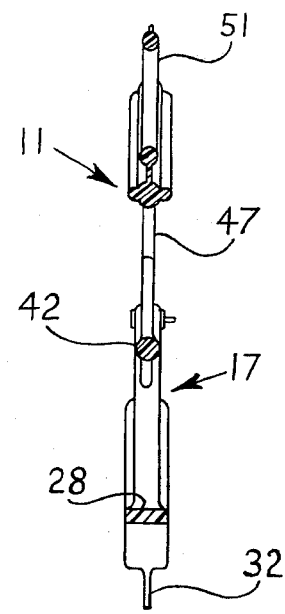
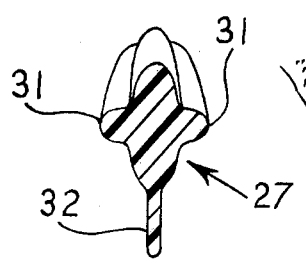
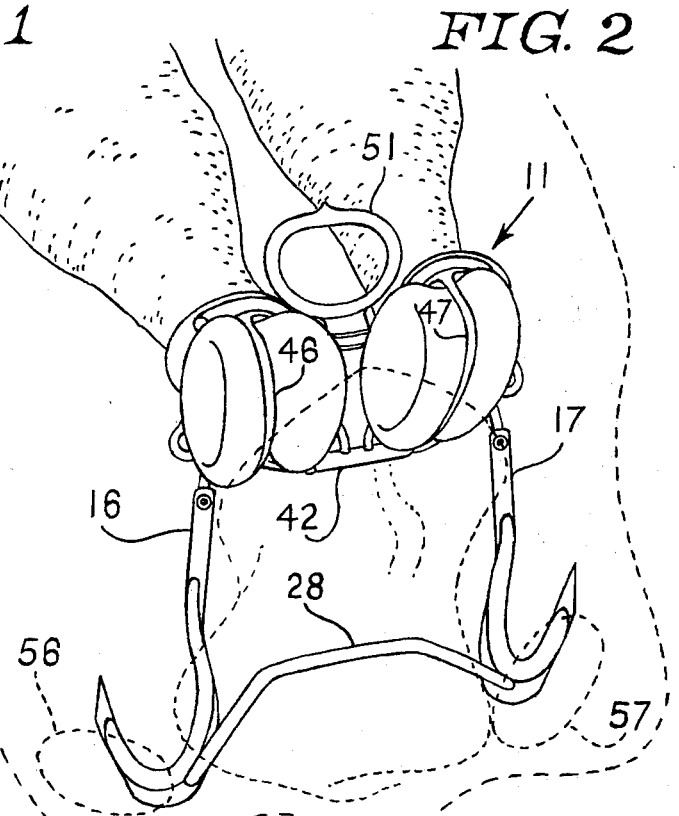

POULTRY LEG RETAINER

This is a continuation-in-part of my co-pending U.S. patent application Ser. No. 476,297, now U.S. Pat. No. 3,895,415, filed in the United States Patent Office on June 4, 1974 for "Retainer for Dressed Poultry".

BACKGROUND OF INVENTION

In the marketing of poultry such as turkeys, for example, it is conventional for the birds to be slaughtered, cleaned and then sold with means holding the legs against the body. Various types of trussing devices have been developed including flexible lines and wire yokes. A highly successful device of this type is set forth in U.S. Pat. No. 3,112,515.

There are two major aspects to the trussing of poultry such as turkeys. In the processing of turkeys it is advantageous to secure the legs against the carcass with the tail folded into the rear carcass opening in order to retain within the cleaned carcass, the neck and giblets. Many turkeys, both fresh and frozen, are trussed at least to the extent of the foregoing during packaging and sale. In the use of turkeys by the housewife it is also very convenient for trussing means to be provided so that the rear carcass opening may be closed following stuffing of the bird.

Poultry leg retainers of the type shown in the above-noted patent comprises a resilient element which hooks into apertures in the backbone of the fowl and extends over the hocks of the legs. Conventionally, a number of different sized retainers must be employed to encompass the substantial variation in size of turkeys, for example, that are marketed. Retainers of this type are normally released from the hocks by the user to gain access to the interior of the carcass of the poultry for retrieving parts of the poultry stored therein and also inserting stuffing in the carcass. The retainer is then reapplied to the hocks with the tail in closing relationship to the carcass opening so as to retain stuffing in the carcass during cooking. If the retainer is too large release and reapplication of the retainer has a tendency to free the hooked ends thereof from the carcass backbone and this is undesirable inasmuch as the housewife may then be unable to reinsert the retainer for trussing the fowl for cooking. If the retainer is too small it is difficult for a housewife or the like to free the legs or hocks from the retainer, and it is particularly difficult to replace the retainer on the hocks.

The present invention provides a particular structure of retainer for the legs of poultry wherein a single retainer is adaptable for use with poultry of widely varying sizes and yet may be readily released and may be readily returned to retaining engagement with the legs of poultry.

SUMMARY OF INVENTION

The present invention provides a simple unitary poultry retainer formed of a plastic material such as nylon or the like having a limited flexibility and being impervious to any and all chemical substances employed in the processing or use of poultry.

The retainer of this invention is physically formed as an upper multiple curved transverse crosspiece preferably having a ring or the like flexibly extending upwardly therefrom and having legs depending from the ends of the piece with a hook extending outwardly from the lower end of each leg. A bar extends transversely between the lower ends of the legs and locking means are provided including a short center bar having resiliently extensible straps extending upwardly to the upper crosspiece. A resiliently extensible portion is provided between the upper ends of each leg of the retainer and the upper crosspiece whereby the downwardly curved ends of the crosspiece may be resiliently deformed outwardly to fit about poultry hocks of different sizes.

In use the present invention is inserted into the rear opening in the carcass of poultry with the hooks extending through openings in the backbone of the carcass to anchor the retainer in position. The upper cross piece is disposed upon and slightly behind the hocks of the poultry with curved ends thereof extending about the sides of the hocks. The center bar of the locking means is disposed immediately beneath and slightly behind the hocks with the resiliently flexible straps of the locking means extending across the knuckle creases of the hocks so that the hocks are drawn together against the carcass of the poultry and are firmly clamped by the retainer. The tail of the poultry is normally pivoted upwardly behind the retainer hereof so as to be maintained in closing relationship to the rear carcass opening.

DESCRIPTION OF FIGURES

The present invention is illustrated as to a preferred embodiment thereof in the accompanying drawings wherein:

FIG. 1 is a plan view of a poultry leg retainer in accordance with the present invention;

FIG. 2 is a central sectional view taken in the plane 2—2 of FIG. 1;

FIG. 3 is a transverse sectional view of a hook of the present invention taken in the plane 3—3 of FIG. 1;

FIG. 4 is a transverse sectional view of the upper crosspiece of the retainer taken in the plane 4—4 of FIG. 1; and FIG. 5 is a perspective view of the retainer of FIG. 1 attached to poultry in leg retaining relationship thereto.

DESCRIPTION OF PREFERRED EMBODIMENT

The present invention, as illustrated in the drawings, is formed as a unitary structure of a plastic material such as nylon. The retainer may be formed, for example, by injection molding and the material of the retainer is substantially impervious to such chemicals and substances as the retainer may come into contact with during processing of poultry and the subsequent coating of same. Additionally, the material of the retainer is such as to be substantially unaffected by temperature variations between freezing and cooking temperatures for poultry.

The structure of the present invention as illustrated in the drawings includes an upper crosspiece 11 formed with a curved configuration having a central downwardly curved portion 12 and upwardly curved end portions 13 and 14 that also curve downwardly at the ends thereof. A pair of spaced vertical legs 16 and 17 are connected one to each end 13 and 14 of the upper crosspiece 11 by means of resiliently extensible portions 18 and 19 respectively. These extensible portions are formed of the same material as the remainder of the retainer but having a somewhat lesser cross section and are each formed as double curved portions that may have somewhat of an S configuration so that they may be longitudinally extended when stretched. The crosspiece 11 has a lateral rib 21 along each side thereof across the central portion 12 and the end portions 13 and 14 but terminating short of the depending ends of the end portions. The ribs are provided for stiffening the upper crosspiece but allow the depending ends thereof to be bent outwardly inasmuch as the ribs do not extend along these ends.

The legs 16 and 17 of the retainer terminate at the bottom thereof in upwardly extending hooks 26 and 27, respectively, and there is provided an upwardly bowed bar 28 between the lower ends of the legs. This bar is preferably formed with a rectangular cross section, as illustrated in FIG. 2, with the major dimension of the bar being normal to the plane of FIG. 1 and, with the upward curvature of the bar, it is then relatively readily deformed upwardly in the center when the legs are pressed toward each other but does not readily deform in any other direction. The purpose of this bar and the particular configuration thereof is further described below.

The hooks 26 and 27 extend outwardly from the lower ends of the legs 16 and 17, as shown in FIG. 1, and are constructed so as to be relatively rigid. To this end there are provided lateral ribs 31 along the lower portion of each side of the legs and extending upwardly almost to the end of the hooks, as shown in FIGS. 1 and 3. There is also provided a deep ridge or flange 32 along the lower edge of the hook and back up to the lower bar 28. This ridge also extends short of the outer end of the hook which is preferably pointed at the upper tip.

In addition to the foregoing portions of the retainer hereof, there is furthermore provided locking means 41 for engaging the hocks of poultry. Such locking means are shown to include a short central bar 42 disposed in the middle of the retainer and connected to the end portions 13 and 14 of the upper crosspiece 11 at the outer ends thereof by elongated resiliently deformable bar ends 43 and 44. These bar ends 43 and 44 are preferably formed of a reduced cross section and include curved portions so as to be resiliently extensible and thus the bar 42 may be pulled out of the plane of FIG. 1, for example, in use of the retainer as discussed below. There is also provided a pair of resiliently extensible curved straps 46 and 47 connected in spaced relation to the central bar 42 and connected to the upper crosspiece 11 on opposite sides of the central curved portion 12 thereof. These straps may extend perpendicularly from the upper crosspiece and then curve back toward the center of the retainer and downwardly into engagement with the center bar.

There is also preferably provided as a portion of the retainer means for lifting the retainer over the hocks of the poultry and this may be comprised as a ring 51 connected by a flexible tab 52 to the top of the center portion 12 of the upper crosspiece. As illustrated in FIG. 1, this ring then nestles into the downwardly curved portion of the crosspiece and provides means for gripping the retainer to pull the upper crosspiece upwardly, as further described below. Means are also provided for locking successive retainers together in a stack for shipping, as described in my above-identified patent application.

Considering now the attachment of the retainer of the present invention to poultry, it is noted that poultry such as turkey has openings in the backbone structure generally termed "kidney openings", as indicated by the numerals 56 and 57 in FIG. 5. In order to affix the retainer to a turkey, for example, the legs 16 and 17 of the retainer are firmly grasped and the hook ends are inserted in the "kidney openings" 56 and 57. Release of the legs by the one inserting the retainer causes the legs to spring outwardly under the influence of the bowed bar 28 so that the points of the hooks are engaged under the backbone of the fowl with the hooks extending through the kidney openings. It will be seen that the legs of the retainer are resiliently pressed together during retainer insertion, and it is important that the bar 28 only bend upwardly in the center and not bend either forward or backward of the retainer during insertion thereof. To this end the bar is originally bent upwardly in a slight bow as illustrated in FIG. 1, and also the bar is made thinner in the vertical dimension than in depth so that the bar cannot readily bend either forward or backward of the retainer when the legs are pressed together. The ribbed structure of the hooks and also the ridges thereon prevent the hooks from deforming so that they will not flatten out or have the ends thereof bend downwardly during later operations with the retainer.

With the retainer hooked in the carcass, the tail of the fowl or poultry is pivoted upwardly in closing relation to the rear carcass opening, and the legs of the poultry are brought together. The upper portion of the retainer is then fitted over the top of the legs at the hooks, and this may be readily accomplished by gripping the ring 51 and pulling the retainer upwardly to slide the upper crosspiece 11 over the top of the hocks into the position illustrated in FIG. 5. During this operation the straps 46 and 47 are located in the knuckle creases of the hocks, again as illustrated in FIG. 5. With the retainer so positioned, the locking means firmly engage the hocks with the center bar 42 immediately below the hocks and the outer ends of the upper crosspiece curved about the outer sides of the hocks. These outer ends of the upper crosspiece are resiliently retained in engagement with the hocks by the resiliently extensible portions 18 and 19.

The retainer of the present invention is particularly adapted for use with poultry of widely varying sizes. It will be appreciated that the length of the center bar is extensible because of the resiliently extensible end portions 43 and 44 thereof and also that the upper crosspiece may be extended first by straightening same through lifting of the center thereof and also by springing the ends further apart by deforming the ends and extending the extensible members 18 and 19. The curved configuration of the straps 46 and 47 also allows these elements to be extended in length. Thus the retainer of the present invention having a size, for example, of that illustrated in FIG. 1, will engage and retain the legs of a 10 pound turkey, for example, and will also extend to engage and retain the legs of a 30 pound turkey, and yet the extensible portions of the particular configuration of the present invention provide for the retainer hereof to firmly engage hocks of these different sizes.

Attachment of the retainer hereof, to poultry of large size wherein the extensible portions of the retainer are in fact resiliently extended, causes the legs of the retainer to be drawn together. This might result in drawing the hooks together so that they would slip out through the openings 56 and 57 in the carcass. In order to preclude such an occurrence the lower bar 28 extends between the bottoms of the legs. Additionally the extensible nature of the center bar 42 limits the inward force applied to the top of the legs, when the locking means is stretched over large hocks. Additionally, it is noted that removal of the retainer from engagement with the hocks in order to gain access to the interior of the poultry carcass calls for stretching or resiliently deflecting portions of the retainer to slip the upper part out of engagement with the hocks. This also then has a tendency to draw the hook ends together so that they would be inclined to slip through the openings in the carcass backbone. The present invention prevents this occurrence by the particular structure described above.

It will, of course, be appreciated that the present invention may be formed of a variety of different materials having the above-noted characteristics and also that the retainers may be readily formed of different colors by the application of dye to the material employed. This is advantageous in certain aspects of processing of poultry for the identification of different batches or origins of poultry.

Although the illustration of FIG. 1 is, in fact, approximately full size, it is not intended to establish thereby the particular dimensions of individual portions of the retainer. It is advantageous to form certain portions with curved configurations, as illustrated and described, and also to form certain portions of reduced cross section and curved configuration in order to achieve desired resilient deflection thereof. Similarly the provision of ribs and ridges upon particular portions of the retainer serves the function of strengthening such portions and limiting flexibility thereof in particular directions. It is, of course, also possible to vary the dimensions of portions of the retainer to achieve desired flexibility or rigidity. In this respect it is noted that the upper cross member is not intended to be deformed normal to the plane of FIG. 1, and consequently, this portion of the retainer is formed with lateral ridges which strengthen the crosspiece against such deflection but yet allow vertical deflection of the crosspiece as desired for slipping the retainer over the hocks of poultry.

It would, of course, be possible to insure rigidity of a particular portion of the retainer such as the hook ends by merely making same of a more massive nature, however, the retainer of the present invention is intended to be used but a single time, and thus the cost of same is of substantial importance. Commonly, poultry such as turkeys are sold to the buying public with retainers attached thereto, and thus the price of the turkey as sold includes the cost of the retainer. Naturally those marketing poultry such as turkeys do not wish to unduly increase the market price so that it is necessary for the retainer of the present invention to be as inexpensive as possible. To this end, minimization of the amount of material employed in the retainer is highly desirable. The preferred embodiment of the present invention illustrated and described herein is designed to minimize the amount of material required while yet achieving each of the requirements for a truly superior retainer.

Although the present invention has been described with respect to a single preferred embodiment thereof, it is not intended to limit the invention to the details of illustration or precise terms of description, for it will be apparent to those skilled in the art that various modifications may be made within the spirit of the invention.

What is claimed is:

1. A poultry leg retainer comprising a crosspiece having a downwardly bowed center,
    a pair of legs depending one from each end of said crosspiece and each having a substantially rigid hook portion extending laterally outward and upwardly from the bottom of the leg,
    a central resiliently extensible bar extending between said legs below said crosspiece for engaging the underside of poultry hocks, and
    a pair of resiliently extensible straps extending between said crosspiece and said central bar in position for fitting in the knuckle creases of poultry hocks.

2. The retainer of claim 1 further defined by a resiliently flexible bar connected between the bottoms of said legs and bowed upwardly therebetween.

3. The retainer of claim 1 further defined by resiliently extensible retainer portions connecting the ends of said crosspiece to the tops of said legs.

4. The retainer of claim 1 further defined by said crosspiece having end portions curving upwardly from said central portion and said end portions also curving downwardly at the outer ends thereof with resiliently extensible portions of the retainer connecting the upper ends of the legs to the downwardly curved ends of the crosspiece.

5. The retainer of claim 1 further defined by
    said legs each having lateral ribs along front and back sides at the lower portion thereof including said hook portion and a ridge along the underside of the hook portion, and
    a resiliently flexible bar extending between said legs substantially at the bottoms thereof with said bar having a greater cross sectional dimension across the legs than longitudinally thereof and being bowed downwardly at the bar ends whereby the bar preferentially bends only upwardly in the center when the legs are forced toward each other.

6. A retainer of claim 1 further defined by said crosspiece having downturned ends and ribs extending along front and back thereof terminating short of the downturned ends whereby the ends are resiliently deflectable outwardly in a direction longitudinally of the crosspiece.

* * * * *